G. W. BELDAM.
PNEUMATIC TIRE FOR VEHICLE WHEELS.
APPLICATION FILED NOV. 12, 1909.
950,429.
Patented Feb. 22, 1910.
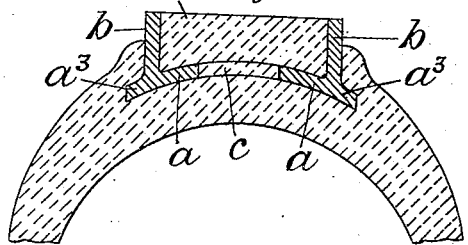
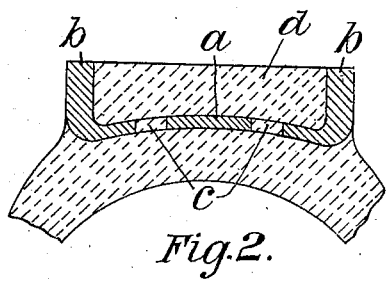
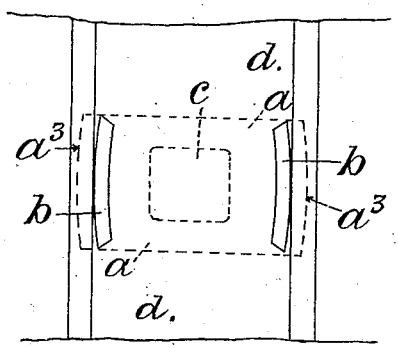
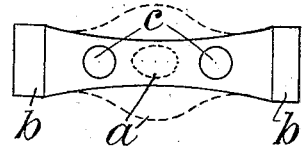
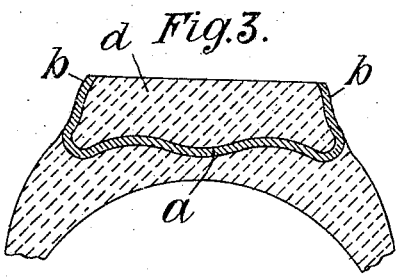
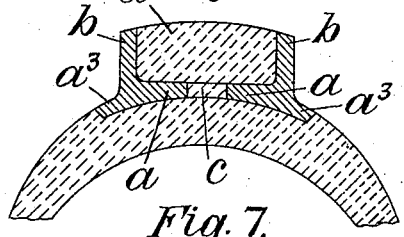
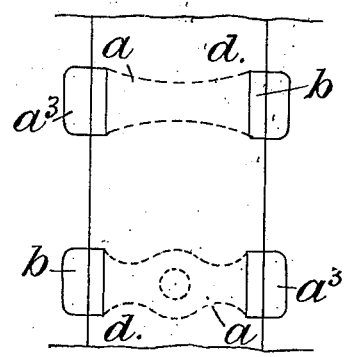
WITNESSES
INVENTOR
George William Beldam

UNITED STATES PATENT OFFICE.

GEORGE WILLIAM BELDAM, OF EALING, ENGLAND.

PNEUMATIC TIRE FOR VEHICLE-WHEELS.

950,429. Specification of Letters Patent. Patented Feb. 22, 1910.

Application filed November 12, 1909. Serial No. 527,637.

*To all whom it may concern:*

Be it known that I, GEORGE WILLIAM BELDAM, a subject of the King of Great Britain and Ireland, residing at Ealing, in the county of Middlesex, England, have invented new and useful Improvements in or Connected with Pneumatic Tires for Vehicle-Wheels, of which the following is a specification.

This invention has reference to pneumatic tires used in connection with wheels of self-propelled vehicles, in which studs are employed on the periphery, and serve as a means of preventing side-slipping or skidding of the tire upon the surface of the road, and protecting it against puncture or damage from objects over which it is running; and has reference more particularly to such tires, provided with hollow or solid studs or devices embedded in the tire.

The object of the present invention is primarily, among others, to provide improvements in connection with such studded tires, or tread portions of same, and studs, which shall have a less wearing and cutting up or damaging effect upon the roads, than those now in use; while, at the same time, they will be more effective as a side-slipping or skidding preventing means, when they act as such.

The invention is illustrated in the accompanying drawings, and in the following description of means for preventing skidding and side-slipping, Figure 1 is a cross sectional view of the invention. Fig. 2 is a plan view of the stud shown in Fig. 1. Fig. 3 is a view like Fig. 1 but showing a modification. Fig. 4 is a like view of another modification. Fig. 5 is a plan view of Fig. 4. Fig. 6 is a view like Fig. 4 of still another modification. Fig. 7 is a plan of Fig. 6.

Referring to the drawings, in which various modifications of the invention are illustrated, Fig. 1 is a cross sectional view of a pneumatic tire or tread showing a non-slipping metal—preferably hard steel—stud or device in position, and of the form shown in plan in Fig. 2. The base plate $a$ of the device is provided with upwardly projecting side cheek portions $b$, and the base $a$ has holes $c$ formed in it. This base part $a$ is embedded in and is practically integral with, that is, in one width, the india-rubber or other tread $d$ of the tire, with the exception of the projecting cheek parts $b$ thereof, which are flush or practically flush and hug closely the sides of the tread $d$ of the tire at the outer edges or sides, which project or stand upward from the body of the tire; this being more clearly shown and seen in Figs. 4 to 7 hereinafter described. This is an important feature of my invention as the stud is, by this means, practically integral with the tire. The faces of the cheeks $b$ may be slightly convex in the direction of rotation of the wheel, if desired, to conform with the surface of the tire tread $d$. The stud devices are molded or built into the fabric of the tire, and are integral therewith; and by forming the holes $c$ in the part $a$, the material forming the tire tread is connected on each side of the base part $a$ through the holes.

In Fig. 2, the dotted line represents a modified form of the base part $a$. The base part $a$ may be curved to conform to the general shape of the tire, or it may be plain, or any suitable shape.

The construction in Fig. 3 is similar to that previously described, with the exception that the part $a$ as well as the cheek parts $b$, are formed of corrugated metal as shown.

The construction shown in Figs. 4 and 5 is that which may be adopted when the tire is built up of different laminæ adhered together, and is otherwise the same as that shown in Figs. 1 and 2, with the exception that the upwardly projecting cheeks or parts $b$ of the metal stud or device are of curved shape forming part of a circle instead of straight, and they are provided at the base with portions $a^3$, which, as well as the base part $a$, are below or within, and integral with, the rubber or fabric of the tire; and the outer edges of the metal cheeks $b$, and the tread rubber $d$, are practically flush or parallel in this case also, the faces of the cheeks $b$ may be slightly convex in the direction of rotation of the wheel.

The modified construction shown in Figs. 6 and 7 is similar to that shown in Figs. 1 and 2, with the exception that the extensions $a^3$ are provided on each side of the upwardly projecting cheeks or parts $b$, they being practically continuations of the base part $a$.

By the above described constructions, when a skid or side slip takes place, the outward projecting cheek or portion $b$ of the steel or metal stud or device, which is at that side toward which the skid or slip is taking place, acts as a preventer of such side slip, engaging with and gripping the surface of the road; while, under normal conditions of running, there will not be a severe contact of hard steel or metal surface which will act upon the road, the wheel mostly running on the rubber or other soft material $d$ of the tire or tread, and the projecting cheek portions $b$ only engaging with the road surface when the lateral movement of the wheel relatively to the road occurs. And as the surface of the tread $d$ wears, the stud device parts $b$ wear with it, and will always continue to act in the same manner, and with complete efficiency, as when new.

The tire may be molded with the metal—say steel—stud devices in it; or, the whole may be built up in any suitable known way. For instance, the rubber part (or rubber and canvas) of the tread may be built up in sections, each section according to its length, containing one or more steel non-skid studs (as described), which are let in from underneath at regular intervals, (according to the size of the non-skid device, which varies with the size of the tire), the base $a$ fitting into a recessed part, and the cheeks $b$ fitting exactly in slots in the side portions of the sections. When these sections are vulcanized to each other and on to the foundation part of the tire, they form a complete homogeneous tire, in which the stud-non-skid parts are secured as an integral part of the tire, by a continuous band of rubber, the continuity of which is only broken by the cheek surfaces $b$ on each side of the tread $d$, which are flush with it.

What is claimed is:—

In a vehicle wheel tire, stud devices spaced from one another circumferentially of the tire consisting of a base portion $a$, and side cheek portions $b$ formed on and projecting outward from the base $a$, embedded in the fabric of the tire; and a rubber tread portion $d$ also projecting outward from the body of the tire; and the outer edges of which, and the outer sides of the cheek portions $b$, are flush with each other; substantially as described.

In testimony whereof I have signed my name to this specification in the presence of two subscribing witnesses.

GEORGE WILLIAM BELDAM.

Witnesses:
 H. D. JAMESON,
 F. L. RAND.